United States Patent
Hæggstrom et al.

(10) Patent No.: US 10,234,266 B2
(45) Date of Patent: Mar. 19, 2019

(54) METHOD FOR CALIBRATING 3D IMAGING AND SYSTEM FOR 3D IMAGING

(71) Applicants: ABO AKADEMI (ABO AKADEMI UNIVERSITY), Turku (FI); HELSINGIN YLIOPISTO, Helsingin Yliopisto (FI)

(72) Inventors: Edward Hæggstrom, Helsinki (FI); Ivan Kassamakov, Helsinki (FI); Anton Nolvi, Jarvenpaa (FI); Tuomo Ylitalo, Helsinki (FI); Niklas Sandler, Helsinki (FI); Tapani Viitala, Espoo (FI); Johan Nyman, Abo (FI)

(73) Assignees: ABO AKADEMI (ABO AKADEMI UNIVERSITY), Turku (FI); HELSINGIN YLIOPISTO, Helsingin Yliopsto (FI)

( * ) Notice: Subject to any disclaimer, the term of this patent is extended or adjusted under 35 U.S.C. 154(b) by 0 days.

(21) Appl. No.: 15/528,679

(22) PCT Filed: Oct. 29, 2015

(86) PCT No.: PCT/FI2015/050744
§ 371 (c)(1),
(2) Date: May 22, 2017

(87) PCT Pub. No.: WO2016/083661
PCT Pub. Date: Jun. 2, 2016

(65) Prior Publication Data
US 2017/0261309 A1   Sep. 14, 2017

(30) Foreign Application Priority Data

Nov. 24, 2014 (FI) .................................... 20146032

(51) Int. Cl.
*G01B 9/02* (2006.01)

(52) U.S. Cl.
CPC ....... *G01B 9/02072* (2013.04); *G01B 9/0209* (2013.01)

(58) Field of Classification Search
None
See application file for complete search history.

(56) References Cited

U.S. PATENT DOCUMENTS 6,490,033 B1 * 12/2002 Coult ................. G01B 11/0675
356/243.1
6,705,385 B2 * 3/2004 Ray .......................... B22C 3/00
148/555

(Continued)

FOREIGN PATENT DOCUMENTS

DE   103 56 829 B3   8/2008
EP   0 660 077 A2   6/1995

(Continued)

OTHER PUBLICATIONS

FI Search Report, dated Jun. 16, 2015, from corresponding FI application.

(Continued)

*Primary Examiner* — Shawn Decenzo
(74) *Attorney, Agent, or Firm* — Young & Thompson

(57) ABSTRACT

A method for calibrating electromagnetic radiation-based three-dimensional imaging includes: obtaining (501) a calibration imaging result at least partly on the basis of electromagnetic waves received from a calibration artifact, forming (502) calibration data on the basis of the calibration imaging result and a known thickness profile of the calibration artifact, and correcting (503), with the aid of the calibration data, an imaging result obtained at least partly on the basis of electromagnetic waves received from a sample to be imaged. The calibration artifact includes layers, for example Langmuir-Blodgett films, having pre-determined thicknesses and stacked on each other so as to achieve the (Continued)

pre-determined thickness profile of the calibration artifact. A three-dimensional imaging system configured to carry out the method.

20 Claims, 5 Drawing Sheets

(56) References Cited

U.S. PATENT DOCUMENTS

| | | | |
|---|---|---|---|
| 2004/0005243 A1* | 1/2004 | Mulhern | B82Y 10/00 422/400 |
| 2006/0290938 A1 | 12/2006 | Heintzann et al. | |
| 2010/0284016 A1 | 11/2010 | Teitell et al. | |
| 2016/0047712 A1* | 2/2016 | Colonna de Lega | G01M 11/0271 356/364 |

FOREIGN PATENT DOCUMENTS

| | | |
|---|---|---|
| FR | 2 703 448 A1 | 10/1994 |
| WO | 2010/066949 A1 | 6/2010 |

OTHER PUBLICATIONS

International Search Report, dated Feb. 15, 2016, from corresponding PCT application.

* cited by examiner

METHOD FOR CALIBRATING 3D IMAGING AND SYSTEM FOR 3D IMAGING

TECHNICAL FIELD

The disclosure relates to electromagnetic radiation-based three-dimensional "3D" imaging that can be, for example but not necessarily, imaging based on interferometry. More particularly, the disclosure relates to a method for calibrating electromagnetic radiation-based 3D imaging and to a system for electromagnetic radiation-based 3D imaging.

BACKGROUND

Electromagnetic radiation-based three-dimensional "3D" imaging, such as e.g. white-light interferometry "WLI", can be used in various applications. For example, bio-imaging in medicine and in many other fields is an established application area of the electromagnetic radiation-based 3D imaging with growth potential both in the academic and commercial settings. Especially, label-free bio-imaging is an emerging and active field that is considered to hold a promise as a way to advance molecular medicine, protein based medicine, and many other fields of medicine. To provide reliable imaging results, a system for electromagnetic radiation-based 3D imaging needs to be calibrated with the aid of a calibration artifact whose thickness profile, i.e. the surface relief, is known with sufficient accuracy. Furthermore, the calibration artifact should have suitable shelf life and desired mechanical and optical properties.

A calibration procedure comprises typically obtaining a calibration imaging result at least partly based on electromagnetic waves received from the calibration artifact, and forming calibration data based on the calibration imaging result and the known thickness profile of the calibration artifact. The calibration data can e.g. be in the form of a lookup table or a correction equation with the aid of which an imaging result can be corrected to correspond to e.g. the surface relief of the imaged sample with sufficient accuracy.

A known way to calibrate electromagnetic radiation-based 3D imaging is based on a calibration artifact that has a hard support core and a soft polymer coating. The hard support core is typically manufactured by machining so as to achieve a desired thickness profile for the hard support core. The soft polymer coating can be made of e.g. SU-8 which is epoxy-based viscous polymer. It can, however, be challenging to control the formation of the soft polymer coating with sufficient accuracy. Furthermore, in some cases, the optical properties of hybrid hard-soft calibration artifacts of the kind described above may not be such as needed.

SUMMARY

The following presents a simplified summary to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying and non-limiting embodiments of the invention.

In accordance with the invention, a new method is provided for calibrating electromagnetic radiation-based three-dimensional "3D" imaging. A method according to the invention comprises:

obtaining a calibration imaging result at least partly based on the first electromagnetic waves received from a calibration artifact featuring a predetermined thickness profile, forming calibration data based on the calibration imaging result and the pre-determined thickness profile of the calibration artifact, and correcting, with the aid of the calibration data, an imaging result obtained at least partly on the basis of second electromagnetic waves received from a sample to be imaged.

The calibration artifact comprises layers having pre-determined thicknesses and stacked on each other to achieve the pre-determined thickness profile of the calibration artifact, and at least a part of the sample and at least a part of the calibration artifact are located concurrently in the field-of-view of the electromagnetic radiation-based three-dimensional imaging so that the first and second electromagnetic waves are received concurrently from the calibration artifact and from the sample.

At least parts of the layers of the calibration artifact are advantageously Langmuir-Blodgett films "LBF". The LBFs can be manufactured in a known way to have a constant thickness of e.g. 2.5 nm. Consequently, the thickness profile of the calibration artifact can be controlled with 2.5 nm steps by controlling the number of LBFs stacked on each other. There can be different numbers of stacked LBFs on different portions of the calibration artifact to achieve a non-flat, e.g. stepped, thickness profile, e.g. curvature defined by discrete steps. The calibration artifact may further comprise steps created by one or more layers each being made of highly ordered pyrolytic graphite "HOPG" and having the thickness greater than that of a LBF. The thickness of each HOPG layer can be e.g. 2 μm. The thickness of each HOPG layer can be controlled with steps of 3 Å. With the aid of the one or more HOPG layers, a sufficient thickness of the calibration artifact can be achieved with a smaller number of LBFs. There can be different numbers of HOPG layers in different portions of the calibration artifact so as to achieve a non-flat, e.g. stepped, thickness profile.

In many cases it is advantageous that each layer that constitutes at least part of an outer surface of the calibration artifact where the first electromagnetic waves depart from the calibration artifact is a LBF because, compared to e.g. HOPG, the optical properties of a LBF are closer to the optical properties of many biological samples.

A calibration artifact of the kind described above can be manufactured e.g. in the following way. First, one takes a substrate of HOPG and peels off, in a known manner, a sufficient number of HOPG layers to have a desired thickness. A more controlled thickness can be achieved by using electron-beam lithography to cut away HOPG material. Next, LBF of a lipid film, e.g. stearic acid or phopshatidyl-choline, is deposited on top of the HOPG substrate by immersing the HOPG substrate, in a known manner, through a monolayer residing on a sub-phase containing monolayer stabilizing counter ions e.g. Uranyl acetate or $CdCl_2$. The stepped thickness profile can be achieved by immersing the calibration artifact being manufactured less deep into the sub-phase for the subsequently made LBF layers. The bottom-most LBF layer can be deposited by rotating the HOPG 180° and immersing it through the monolayer residing on the sub-phase.

Unlike calibration artifacts of many other kinds, the above-described calibration artifact has optical and mechanical properties close to those of many biological tissues. Furthermore, the calibration artifact can be controlled to have a desired thickness profile with accurately known dimensions since the thickness profile is a natural and inherent result of the manufacturing process of the calibration artifact.

The preferential materials used for preparing a step-profile artifact by the Langmuir Blodgett "LB" deposition are fatty acids, fatty alcohols, fatty amines, phospholipids, sterols, and any amphiphilic derivatives of these because these can be used to form even single layers of precise thicknesses between 2-4 nm. The preferential step heights can be produced by repetitive multiple deposition of these flat single layers by the LB technique. Additionally, these materials allow producing steps having precise heights and being free of labeling agents, which allows label-free calibration. Polymer LB films usually form thicker layers than 2-4 nm and are often not as smooth and even as those made from the above-mentioned fatty acids, fatty alcohols, fatty amines, phospholipid monolayers/multilayers, sterols, and amphiphilic derivatives of these. Some polymer layers can also be very difficult or even impossible to deposit by the LB technique due to their stiffness.

The WLI/Linnik system can be used as a quality assessment tool for molecular and organic molecular electronic devices during research and development "R&D" and/or during production so as to assess thin layer homogeneity, smoothness, and/or appearance of cracks. The molecular and organic molecular electronic devices can be for example solar cells, organic solar cells, photovoltaics devices, and/or organic photovoltaics devices. Smooth, even, and defect-free layers are important in these devices because defects in these layers disturb electron movement and thus the efficacy of these devices.

The electromagnetic radiation-based 3D imaging can be e.g. based on interference between electromagnetic waves reflected from an object being imaged and other electromagnetic waves reflected from a reference reflector. The interferometry can e.g. be white-light interferometry "WLI", white-light polarization interferometry "WLPI", stroboscopic scanning white-light interferometry "SSWLI" and/or stroboscopic scanning white-light polarization interferometry "SSWLPI". Furthermore, the sample and the calibration artifact can be immersed in liquid e.g. immersion oil and the interferometry can be provided with the known Michelson or Linnik arrangement to compensate for imaging errors that would otherwise be caused by the immersing. In some applications, the artifact can e.g. be inside a microfluidic channel of a lab-on-chip "LOC"-like system. Furthermore, the sample and the calibration artifact can be static or they can be oscillating during the 3D imaging.

For another non-limiting example, the electromagnetic radiation-based 3D imaging can be based on laser triangulation with the aid of which the surfaces of the calibration artifact and a sample can be scanned.

In accordance with the invention, there is also provided a new system for electromagnetic radiation-based three-dimensional "3D" imaging. A system according to the invention comprises:
  a calibration artifact of the kind described above,
  an imaging device for obtaining a calibration imaging result at least partly based on the first electromagnetic waves received from the calibration artifact and for obtaining an imaging result at least partly based on second electromagnetic waves received from a sample to be imaged, and
  processing equipment for forming calibration data on the basis of the calibration imaging result and the pre-determined thickness profile of the calibration artifact, and for correcting the imaging result with the aid of the calibration data.

The imaging device is configured to obtain the calibration imaging result and the imaging result concurrently in a situation in which at least a part of the sample and at least a part of the calibration artifact are located concurrently in a field-of-view of the imaging device, and the imaging device is configured to receive the first and second electromagnetic waves concurrently.

A number of exemplifying and non-limiting embodiments of the invention are described in accompanied dependent claims.

Exemplifying and non-limiting embodiments of the invention both as to constructions and to methods of operation, together with additional objects and advantages thereof, are best understood from the following description of specific exemplifying embodiments when read in connection with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

Exemplifying and non-limiting embodiments of the invention and their advantages are explained in greater detail below with reference to the accompanying drawings, in which.

DESCRIPTION OF EXEMPLIFYING AND NON-LIMITING EMBODIMENTS

Figure 1:
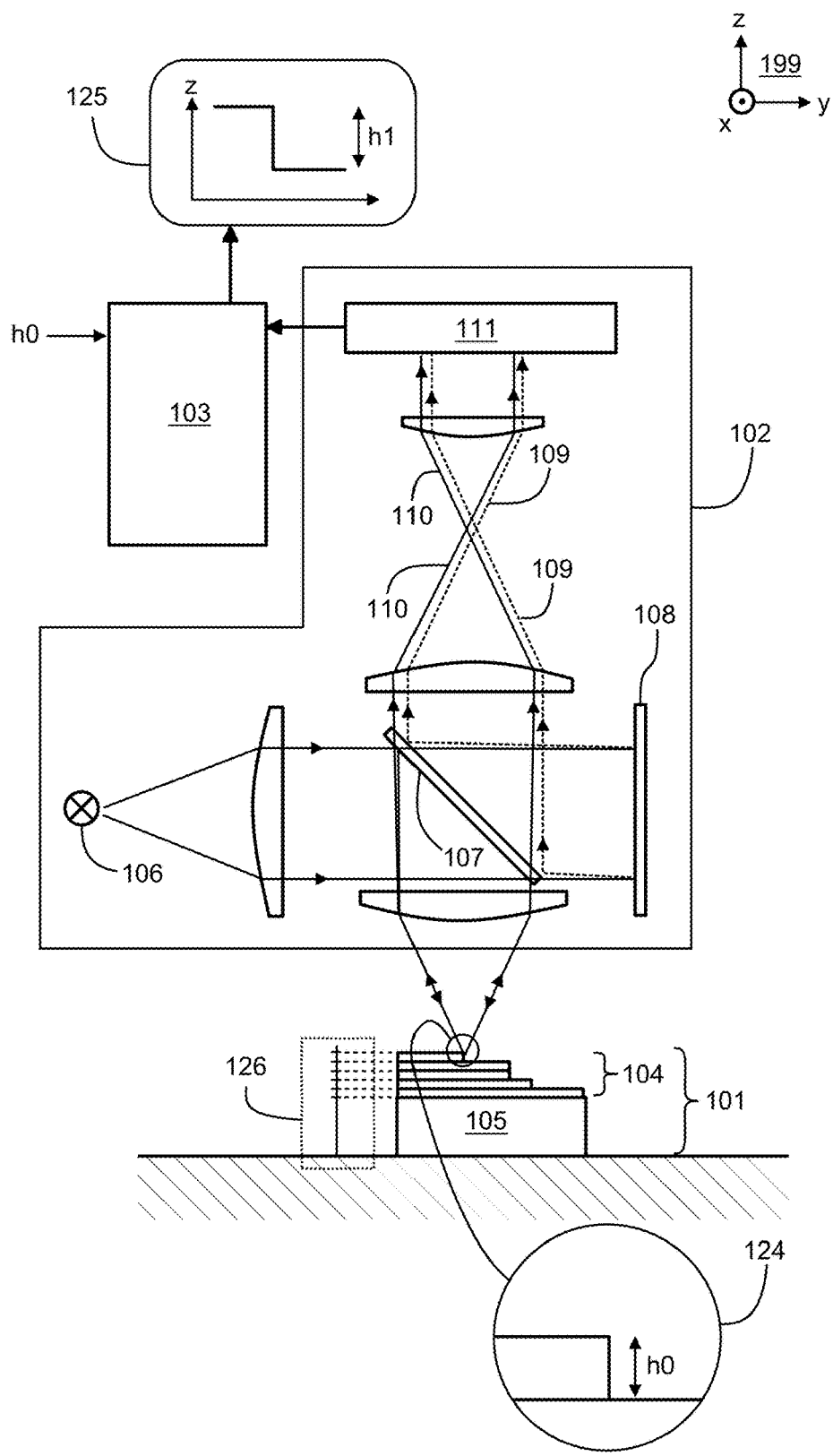
FIG. 1 shows a schematic illustration of a system according to an exemplifying and non-limiting embodiment of the invention for electromagnetic radiation-based three-dimensional "3D" imaging.

FIG. 1 shows a schematic illustration of a system according to an exemplifying and non-limiting embodiment of the invention for electromagnetic radiation-based three-dimensional "3D" imaging. The system comprises a calibration artifact 101 that has a predetermined thickness profile. In the case shown in FIG. 1, the thickness of the calibration artifact 101 is in the z-direction of a coordinate system 199. The calibration artifact 101 comprises layers 104 and 105 having pre-determined thicknesses that are stacked on each other to achieve the pre-determined thickness profile. The layers 104 of the calibration artifact are advantageously Langmuir-Blodgett films "LBF". As illustrated in FIG. 1, there are different numbers of stacked LBFs in different portions of the calibration artifact 101 to achieve a stepped thickness profile. The stepped thickness profile constitutes a ruler-scale in the z-direction of the coordinate system 199. A part 126 of FIG. 1 illustrates the ruler-scale. The part 126 of FIG. 1 is for illustrative purposes only, and it does not typically have any counterpart in a real imaging system. The layer 105 of the calibration artifact 101 can be e.g. a highly ordered pyrolytic graphite "HOPG" layer having the thickness greater than that of each LBF.

The system comprises an imaging device 102 for obtaining a calibration imaging result at least partly on the basis of electromagnetic waves received from the calibration artifact 101 and for obtaining an imaging result at least partly on the basis of electromagnetic waves received from a sample to be imaged. The sample is not shown in FIG. 1. The system comprises processing equipment 103 for forming calibration data by comparing the calibration imaging result to the known thickness profile of the calibration artifact 101. After the calibration data has been formed, the processing equipment 103 is configured to calibrate imaging results with the aid of the calibration data. The calibration data can be e.g. in the form of a lookup table or a correction equation with the aid of which an imaging result can be corrected to correspond to e.g. the surface relief of an imaged sample with sufficient accuracy.

In the exemplifying system illustrated in FIG. 1, the imaging device 102 is an interferometer that comprises a light source 106, a dichroic mirror 107, a reference reflector 108, and an imaging sensor 111 that can be e.g. a charge-coupled device "CCD" sensor. Furthermore, the imaging device 102 comprises lenses for focusing and collimating light in desired ways. In cases where the calibration artifact and samples to be imaged are immersed in liquid e.g. immersion oil, the imaging device 102 comprises advantageously the Michelson or Linnik compensation arrangement for compensating imaging errors that would be otherwise caused by the immersing. Imaging in the z-direction of the coordinate system 199 is based on the interference between electromagnetic waves reflected from the calibration artifact 101 and other electromagnetic waves reflected from the reference reflector 108. In FIG. 1, the propagation of the electromagnetic waves reflected from the calibration artifact 101 is depicted with lines 110 and the propagation of the electromagnetic waves reflected from the reference reflector 108 is depicted with dashed lines 109. The interferometer can be e.g. a white-light interferometer "WLI", a white-light polarization interferometer "WPLI", and/or a stroboscopic scanning white-light interferometer "SSWLI".

Without limiting the generality and merely for illustrative purposes, we consider a detail shown in a partial magnification 124. As shown in the partial magnification 124, the calibration artifact 101 has a step-profile the height, h0. The A part 125 of FIG. 1 represents such information derived from the calibration imaging result which corresponds to the above-mentioned step-profile. The processing equipment 103 is configured to estimate the height of the step-profile based on the output data from the imaging sensor 111. As shown in FIG. 1, the height estimate is h1. In this exemplifying case where the imaging device 102 is an interferometer, h1 is extracted from an interference pattern captured by the imaging sensor 111. A piece of the calibration data ('correction factor') is constructed based on the known h0 and the estimate h1. For example, this correction factor can be entered into a lookup table or a correction equation can be tuned accordingly.

Figure 2:
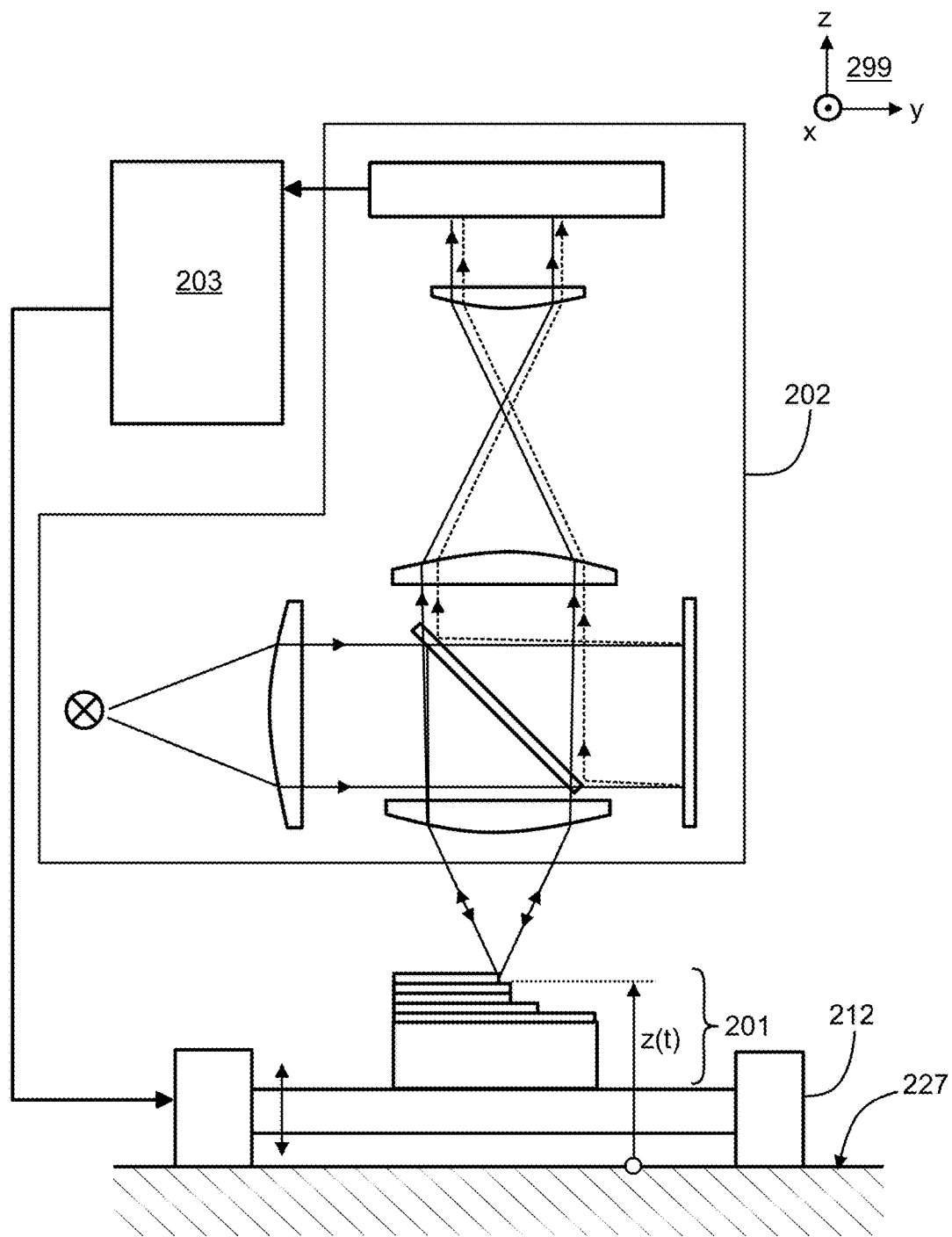
FIG. 2 shows a schematic illustration of a system according to another exemplifying and non-limiting embodiment of the invention for electromagnetic radiation-based 3D imaging.

FIG. 2 shows a schematic illustration of a system according to an exemplifying and non-limiting embodiment of the invention for electromagnetic radiation-based 3D imaging. The system comprises a calibration artifact 201 of the kind described above, an imaging device 202 for obtaining a calibration imaging result and for obtaining imaging results to be calibrated, and processing equipment 203 for forming calibration data and for correcting imaging results with the aid of the calibration data. The system further comprises an actuator 212 for moving the calibration artifact 201 parallel with the z-direction of a coordinate system 299 according to a pre-determined trajectory. The trajectory can e.g. be sinusoidal so that the z-position z(t) of the calibration artifact 201 with respect to a reference level, e.g. a surface 227, can be $z(t)=z0+A \sin(2\pi ft)$, where A is the amplitude of the z-directional movement, f is the frequency, and t is time. The imaging device 202 is configured to obtain a temporal trend of the calibration imaging result at least partly based on the electromagnetic waves received from the moving calibration artifact 201. The processing equipment 203 is configured to form trajectory calibration data based on the temporal trend of the calibration imaging result and the pre-determined trajectory. After the trajectory calibration data has been formed, the processing equipment 203 is configured to compute a trajectory of a moving sample on the basis of a temporal trend of an imaging result taken from the sample and the above-mentioned trajectory calibration data. In this exemplifying case where the calibration artifact 201 and a sample to be imaged move, the imaging device 202 is advantageously a stroboscopic scanning white-light interferometer "SSWLI". In a system according to another exemplifying and non-limiting embodiment of the invention, the calibration artifact is moved non-continuously in the z-direction so that the calibration artifact is occasionally moving and occasionally stationary. In this case the calibration imaging results are obtained during time intervals when the calibration artifact is stationary.

The processing equipment 103 shown in FIG. 1, as well as the processing equipment 203 shown in FIG. 2, can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 3:
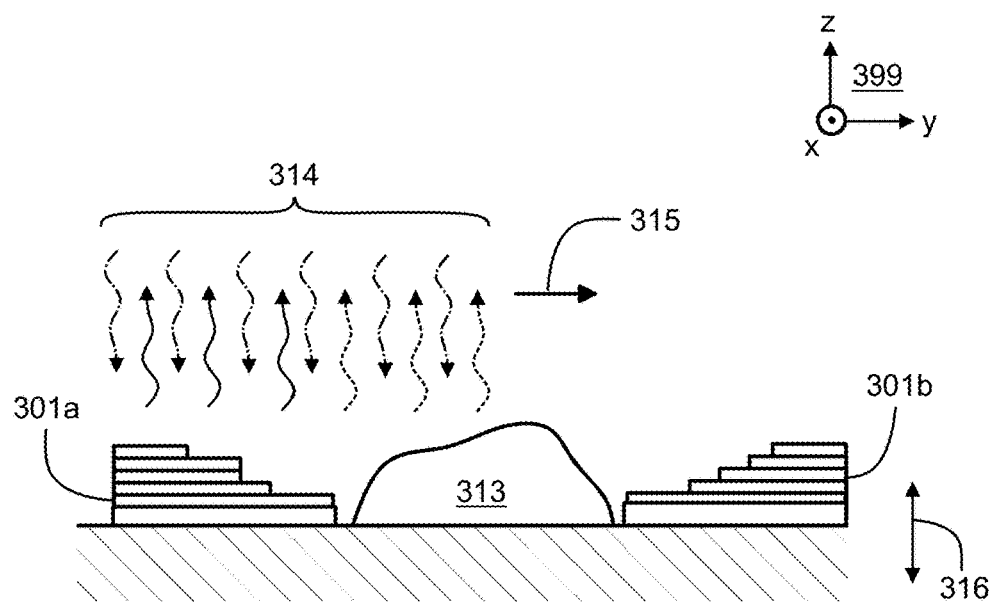
FIG. 3 illustrates a part of a system according to an exemplifying and non-limiting embodiment of the invention for electromagnetic radiation-based 3D imaging.

FIG. 3 illustrates a part of a system according to an exemplifying and non-limiting embodiment of the invention for electromagnetic radiation-based 3D imaging. In this exemplifying case, the imaging device of the system is configured to obtain a calibration imaging result and an imaging result of a sample 313 in a situation in which the calibration artifact 301a and the sample are located adjacent to each other as illustrated in FIG. 3. Consequently, the imaging arrangement does not have to be changed after obtaining the calibration imaging result and prior to obtaining the imaging result of the sample. Therefore, the calibration circumstances correspond in a reliable way to the circumstances when the imaging result of the sample 313 is obtained. In FIG. 3, the electromagnetic waves propagating towards the calibration artifact 301a and the sample are depicted with dash-and-dot line wavy arrows, the electromagnetic waves reflected from the calibration artifact 301a are depicted with solid line wavy arrows, and the electromagnetic waves reflected from sample 313 are depicted with dashed line wavy arrows. The imaging device of the system is not shown in FIG. 3.

Advantageously, at least a part of the sample 313 and at least a part of the calibration artifact 301a are located concurrently in a field-of-view "FOV" 314 of the imaging device. In this case, the calibration imaging result and the imaging result of the sample belong to a same image and thus a good accuracy of the calibration can be achieved. This approach provides instantaneous calibration which is advantageous especially in cases where a large stitched image is constructed so that the field-of-view "FOV" 314 is moving with respect to the sample 313 and the calibration artifact 301a. The system can be provided with many calibration artifacts in order to provide appropriate calibration in different positions of the field-of-view "FOV" 314. In the exemplifying case illustrated in FIG. 3, there is another calibration artifact 301b and the FOV 314 is moving in the positive y-direction of a coordinate system 399. The FOV movement is depicted with an arrow 315. Also in this case, the calibration artifacts and the sample can be moved in the z-direction as illustrated with an arrow 316.

Figure 4:
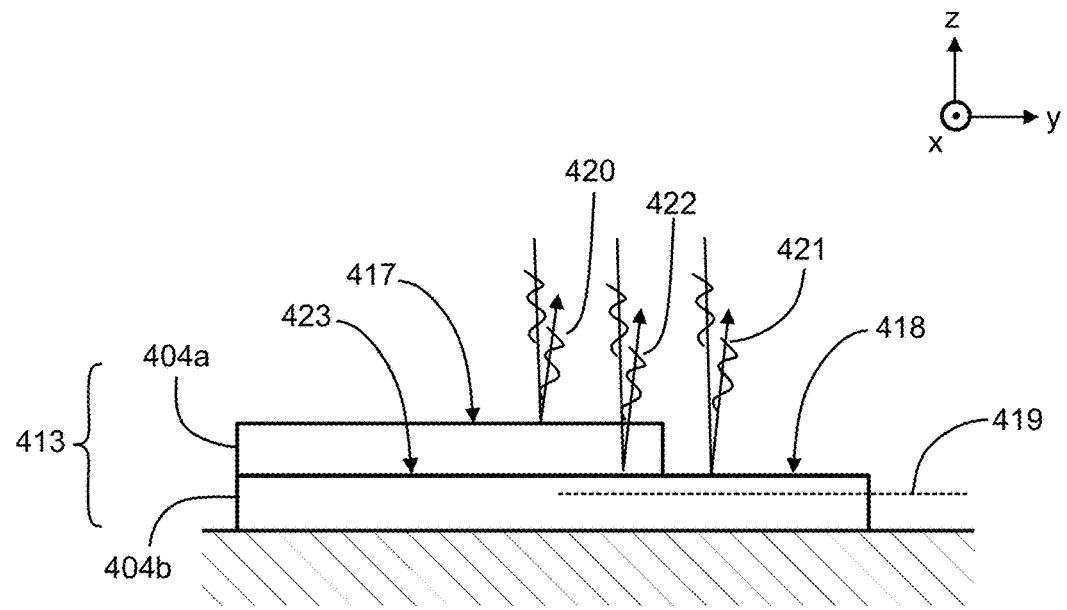
FIG. 4 illustrates a part of a system according to an exemplifying and non-limiting embodiment of the invention for electromagnetic radiation-based 3D imaging.

FIG. 4 illustrates a part of a system according to an exemplifying and non-limiting embodiment of the invention for electromagnetic radiation-based 3D imaging. In this exemplifying case the sample 413 comprises first and second layers 404a and 404b stacked on each other and constituting a step-profile whose height is a thickness of the first layer 404a. The sample 413 can be similar to the calibration artifacts shown in FIGS. 1-3. The layers 404a and 404b can be Langmuir-Blodgett films "LBF". The sample 413 can be laden for example with drug under study, in which case there can be a need to determine how much the refractive index of the sample is changed by the drug. The system comprises processing equipment configured to obtain a first estimate for the thickness of the first layer 404a at least partly on the basis of electromagnetic waves 420 reflected from a surface 417 of the first layer and electromagnetic waves 421 reflected outside the first layer from a surface 418 of the second layer 404b. The processing equipment is configured to obtain a second estimate for the thickness at least partly on the basis of the electromagnetic waves 420 and electromagnetic waves 422 reflected inside the first layer 404a from a boundary 423 between the first and second layers. The processing equipment is configured to compute an estimate for the refractive index of the sample on the basis of the first and second estimates of the height. From the viewpoint of the interference of the electromagnetic waves 420 and 422 at an image sensor, the optical thickness of the first layer 404a is greater than the real thickness of the first layer because the wave length is shorter in the material of the sample than outside the sample 413, i.e. the boundary 423 may appear to be in a place of the dashed line 419. The above-mentioned processing equipment and the image sensor are not shown in FIG. 4.

Figure 5:
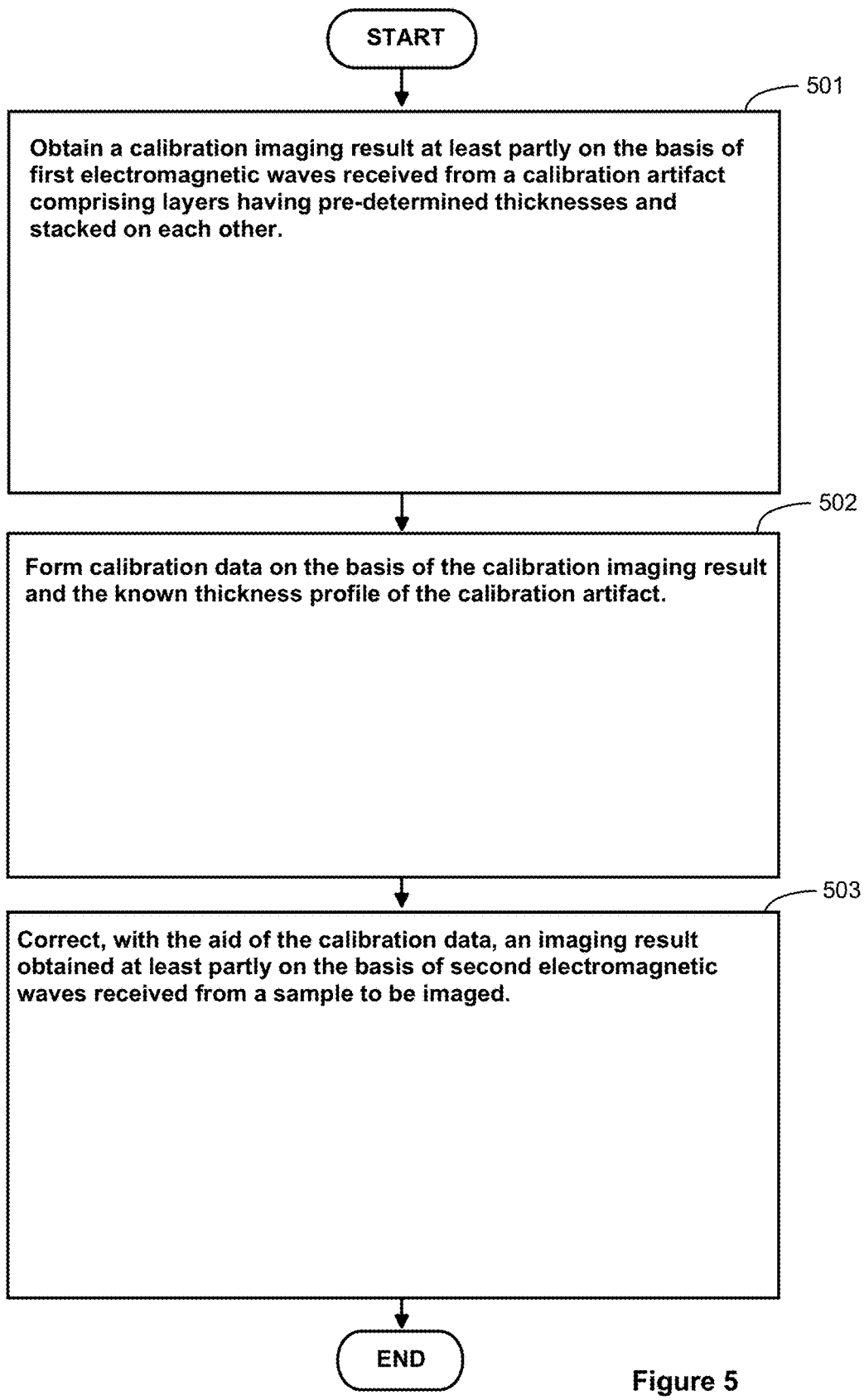
FIG. 5 shows a flowchart of a method according to an exemplifying and non-limiting embodiment of the invention for calibrating electromagnetic radiation-based 3D imaging.

FIG. 5 shows a flowchart of a method according to an exemplifying and non-limiting embodiment of the invention for calibrating electromagnetic radiation-based 3D imaging. The method comprises the following actions:

action 501: obtaining a calibration imaging result at least partly based on first electromagnetic waves received from a calibration artifact comprising layers having pre-determined thicknesses and being stacked on each other to achieve a pre-determined thickness profile, action 502: forming calibration data based on the calibration imaging result and the pre-determined thickness profile of the calibration artifact, and action 503: correcting, with the aid of the calibration data, an imaging result obtained at least partly on the basis of second electromagnetic waves received from a sample to be imaged.

In a method according to an exemplifying and non-limiting embodiment of the invention, the calibration artifact comprises layers each being a Langmuir-Blodgett film "LBF".

In a method according to an exemplifying and non-limiting embodiment of the invention, each layer that constitutes at least a part of a surface of the calibration artifact where the first electromagnetic waves depart from the calibration artifact is a LBF.

In a method according to an exemplifying and non-limiting embodiment of the invention, the layers of the calibration artifact comprise at least one second layer made of highly ordered pyrolytic graphite "HOPG" and having a thickness greater than the thickness of each of the first layers.

In a method according to an exemplifying and non-limiting embodiment of the invention, the pre-determined thickness profile of the calibration artifact is a stepped thickness profile such that the number of layers is different at different portions of the calibration artifact. The stepped thickness profile constitutes a ruler-scale along the depth direction in which the first electromagnetic waves depart from the calibration artifact.

In a method according to an exemplifying and non-limiting embodiment of the invention, the calibration artifact and the sample are located adjacent to each other in a direction transversal to the depth direction when the calibration imaging result is obtained and when the imaging result is obtained.

In a method according to an exemplifying and non-limiting embodiment of the invention, at least part of the sample and at least part of the calibration artifact are located concurrently in a field-of-view of the electromagnetic radiation-based three-dimensional imaging, and the first and second electromagnetic waves are received concurrently from the calibration artifact and from the sample.

A method according to an exemplifying and non-limiting embodiment of the invention comprises:

moving the calibration artifact parallel with the depth direction and according to a pre-determined trajectory, obtaining a temporal trend of the calibration imaging result at least partly based on the first electromagnetic waves received from the moving calibration artifact, forming trajectory calibration data based on the temporal trend of the calibration imaging result and the pre-determined trajectory, and computing a trajectory of the sample on the basis of a temporal trend of the imaging result and the trajectory calibration data.

In a method according to an exemplifying and non-limiting embodiment of the invention, the sample comprises first and second layers stacked on each other and constituting a step-profile whose height is the thickness of the first layer, and the method comprises:

obtaining a first estimate for the height at least partly based on a first portion of the second electromagnetic waves reflected from a surface of the first layer and a second portion of the second electromagnetic waves reflected outside the first layer from a surface of the second layer, obtaining a second estimate for the height at least partly based on the first portion of the second electromagnetic waves and a third portion of the second electromagnetic waves reflected inside the first layer from the boundary between the first and second layers, and computing an estimate for the refractive index of material of the first layer on the basis of the first and second estimates of the height.

In a method according to an exemplifying and non-limiting embodiment of the invention, the electromagnetic radiation-based three-dimensional imaging is interferometry based on interference between electromagnetic waves reflected from an object being imaged and other electromagnetic waves reflected from a reference reflector.

In a method according to an exemplifying and non-limiting embodiment of the invention, the interferometry is at least one of the following: white-light interferometry, white-light polarization interferometry, and stroboscopic scanning white-light interferometry.

Figure 6:
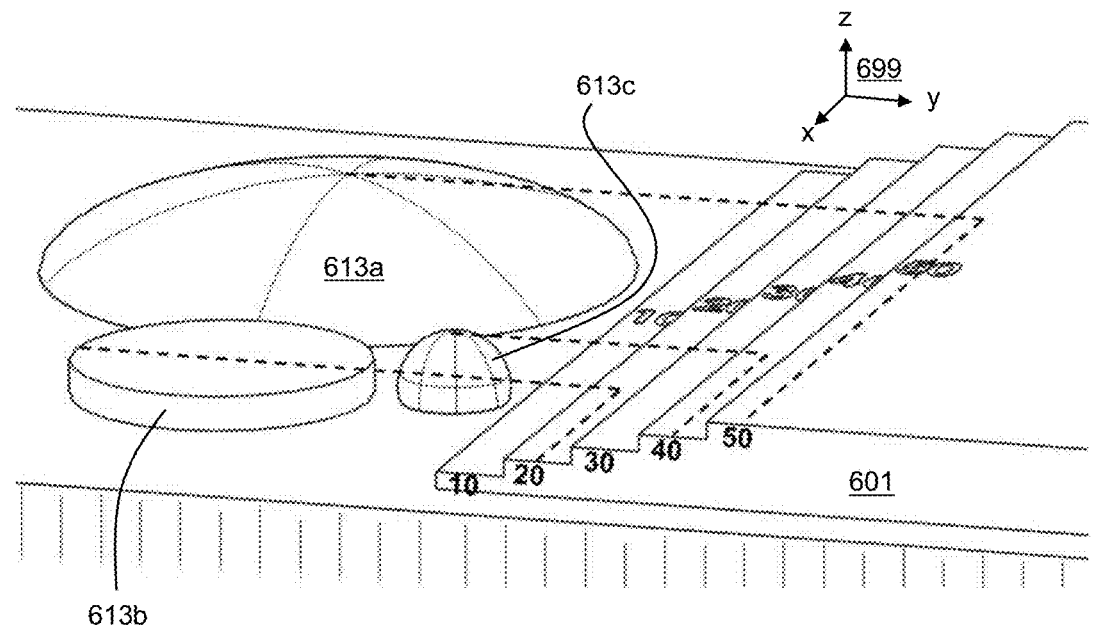
FIG. 6 illustrates a part of a system according to an exemplifying and non-limiting embodiment of the invention for electromagnetic radiation-based 3D imaging.

FIG. 6 illustrates a part of a system according to an exemplifying and non-limiting embodiment of the invention for electromagnetic radiation-based 3D imaging. In this exemplifying case, the imaging device of the system is configured to obtain imaging results that are indicative of the height profiles of samples 613a, 613b, and 613c. The height profiles of the samples are obtained with the aid of a calibration artifact 601 that has a stepped thickness profile that constitutes a ruler-scale in the depth direction, i.e. in the z-direction of the coordinate system 699. The imaging results that are indicative of the height profiles of the samples 613a, 613b, and 613c can be obtained by finding out which parts of the samples cause a similar interference as each of the steps of the calibration artifact 601. In the exemplifying case illustrated in FIG. 6, the calibration artifact 601 has five steps having the heights of 10, 20, 30, 40, and 50 units of length, e.g. nanometers.

Figure 7:
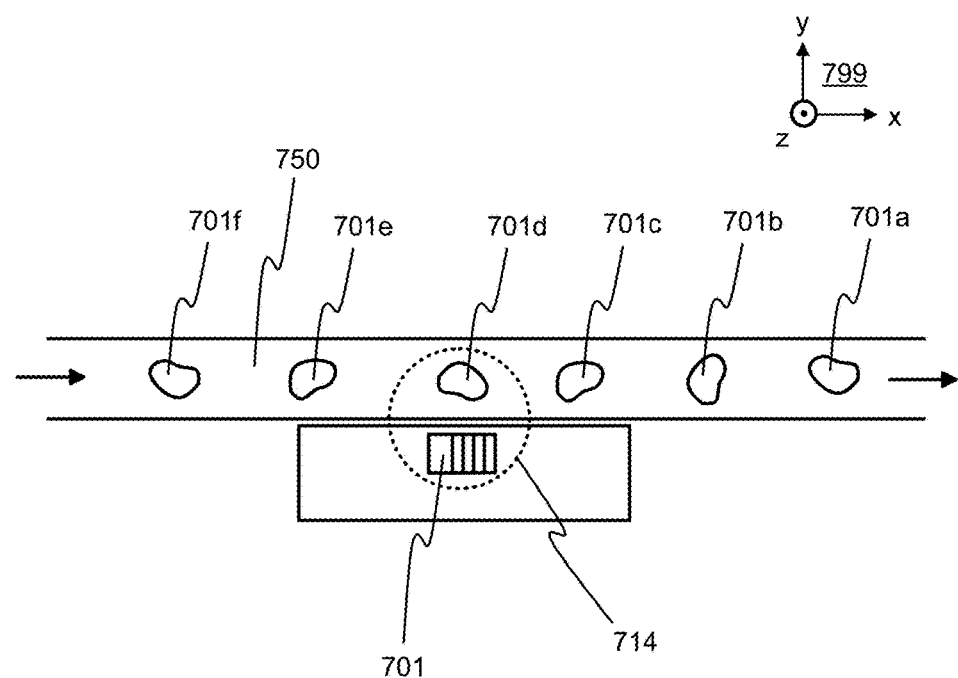
FIG. 7 illustrates a part of a system according to an exemplifying and non-limiting embodiment of the invention for electromagnetic radiation-based 3D imaging.

FIG. 7 illustrates a part of a system according to an exemplifying and non-limiting embodiment of the invention for electromagnetic radiation-based 3D imaging. The system is configured to carry out 3D imaging for many samples one by one. In FIG. 7, six of the samples are denoted with figure references 701a, 701b, 701c, 701d, 701e, and 701f. The samples are moved in the x-direction of a coordinate system 799 by a translation and/or horizontal rotation device 750, e.g. a conveyor belt, so that each of the samples is in its turn in the field-of-view "FOV" 714 of the imaging device. In the exemplifying situation shown in FIG. 7, the sample 701d is in the field-of-view "FOV" 714. The system comprises a calibration artifact 701 that is also in the field-of-view "FOV" 714 of the imaging device. As the sample under consideration and the calibration artifact 701 belong to a same image, accurate 3D imaging can be achieved.

The non-limiting, specific examples provided in the description given above should not be construed as limiting the scope and/or the applicability of the appended claims. Furthermore, any list or group of examples presented in this document is not exhaustive unless otherwise explicitly stated.

What is claimed is:

1. A method for calibrating electromagnetic radiation-based three-dimensional imaging, the method comprising:
    obtaining a calibration imaging result at least partly on the basis of first electromagnetic waves received from a calibration artifact having a predetermined thickness profile;
    forming calibration data on the basis of the calibration imaging result and the pre-determined thickness profile of the calibration artifact; and
    correcting, with the aid of the calibration data, an imaging result obtained at least partly on the basis of second electromagnetic waves received from a sample to be imaged,
    wherein a thickness of the calibration artifact is in a depth direction in which the first electromagnetic waves depart from the calibration artifact, wherein the calibration artifact comprises layers having pre-determined thicknesses and stacked on each other so as to achieve the pre-determined thickness profile of the calibration artifact, and
    wherein at least part of the sample and at least part of the calibration artifact are located concurrently in a field-of-view of the electromagnetic radiation-based three-dimensional imaging, and the first and second electromagnetic waves are received concurrently from the calibration artifact and from the sample.

2. The method according to claim 1, wherein the layers of the calibration artifact comprise first layers each being a Langmuir-Blodgett film.

3. The method according to claim 2, wherein each layer that constitutes at least part of a surface of the calibration artifact where the first electromagnetic waves depart from the calibration artifact is a Langmuir-Blodgett film.

4. The method according to claim 3, wherein the layers of the calibration artifact comprise at least one second layer made of highly ordered pyrolytic graphite and having a thickness greater than a thickness of each of the first layers.

5. The method according to claim 2, wherein the layers of the calibration artifact comprise at least one second layer made of highly ordered pyrolytic graphite and having a thickness greater than a thickness of each of the first layers.

6. The method according to claim 1, wherein the pre-determined thickness profile of the calibration artifact is a stepped thickness profile so that the number of the layers is different in different portions of the calibration artifact, the stepped thickness profile constituting a ruler-scale in the depth direction.

7. The method according to claim 1, wherein the method comprises:
    moving the calibration artifact parallel with the depth direction and according to a pre-determined trajectory,
    obtaining a temporal trend of the calibration imaging result at least partly based on the first electromagnetic waves received from the moving calibration artifact,
    forming trajectory calibration data based on the temporal trend of the calibration imaging result and the pre-determined trajectory, and
    computing a trajectory of the sample based on a temporal trend of the imaging result and the trajectory calibration data.

8. A method according to claim 1, wherein the sample comprises first and second layers stacked on each other and constituting a step-profile whose height is a thickness of the first layer, and the method comprises:
    obtaining a first estimate for the height at least partly on the basis of a first portion of the second electromagnetic waves reflected from a surface of the first layer and a second portion of the second electromagnetic waves reflected outside the first layer from a surface of the second layer,
    obtaining a second estimate for the height at least partly on the basis of the first portion of the second electromagnetic waves and a third portion of the second electromagnetic waves reflected inside the first layer from a boundary between the first and second layers, and computing an estimate for a refractive index of material of the first layer on the basis of the first and second estimates of the height.

9. The method according to claim 1, wherein the electromagnetic radiation-based three-dimensional imaging is interferometry based on interference between electromagnetic waves reflected from an object being imaged and other electromagnetic waves reflected from a reference reflector.

10. The method according to claim 9, wherein the interferometry is at least one of the following: white-light interferometry, white-light polarization interferometry, stroboscopic scanning white-light interferometry, stroboscopic scanning white-light polarization interferometry.

11. A system for electromagnetic radiation-based three-dimensional imaging, the system comprising:
a calibration artifact having a predetermined thickness profile;
an imaging device for obtaining a calibration imaging result at least partly on the basis of first electromagnetic waves received from the calibration artifact and for obtaining an imaging result at least partly on the basis of second electromagnetic waves received from a sample to be imaged; and
processing equipment for forming calibration data on the basis of the calibration imaging result and the pre-determined thickness profile of the calibration artifact and for correcting the imaging result with the aid of the calibration data,
wherein a thickness of the calibration artifact is in a depth direction in which the first electromagnetic waves depart from the calibration artifact, wherein the calibration artifact comprises layers having pre-determined thicknesses and stacked on each other so as to achieve the pre-determined thickness profile of the calibration artifact, and
wherein the imaging device is configured to obtain the calibration imaging result and the imaging result concurrently in a situation in which at least a part of the sample and at least a part of the calibration artifact are located concurrently in a field-of-view of the imaging device, and the imaging device is configured to receive the first and second electromagnetic waves concurrently.

12. The system according to claim 11, wherein the layers of the calibration artifact comprise first layers each being a Langmuir-Blodgett film.

13. The system according to claim 12, wherein each layer that constitutes at least a part of a surface of the calibration artifact where the first electromagnetic waves depart from the calibration artifact is a Langmuir-Blodgett film.

14. The system according to claim 13, wherein the layers of the calibration artifact comprise at least one second layer made of highly ordered pyrolytic graphite and having a thickness greater than a thickness of each of the first layers.

15. The system according to claim 12, wherein the layers of the calibration artifact comprise at least one second layer made of highly ordered pyrolytic graphite and having a thickness greater than a thickness of each of the first layers.

16. The system according to claim 11, wherein the pre-determined thickness profile of the calibration artifact is a stepped thickness profile so that the number of the layers is different in different portions of the calibration artifact, the stepped thickness profile constituting a ruler-scale in the depth direction.

17. The system according to claim 11, wherein:
the system comprises an actuator for moving the calibration artifact parallel with the depth direction and according to a pre-determined trajectory;
the imaging device is configured to obtain a temporal trend of the calibration imaging result at least partly on the basis of the first electromagnetic waves received from the moving calibration artifact; and
the processing equipment is configured to form trajectory calibration data on the basis of the temporal trend of the calibration imaging result and the pre-determined trajectory,
wherein the processing equipment is configured to compute a trajectory of the sample on the basis of a temporal trend of the imaging result and the trajectory calibration data.

18. The system according to claim 11, wherein the processing equipment is configured to:
obtain a first estimate for a thickness of a first layer of the sample on the basis of the imaging result, the first estimate being based at least partly on a first portion of the second electromagnetic waves reflected from a surface of the first layer and a second portion of the second electromagnetic waves reflected outside the first layer from a surface of a second layer of the sample attached to and partially covered by the first layer,
obtain a second estimate for the thickness of the first layer on the basis of the imaging result, the second estimate being based at least partly on the first portion of the second electromagnetic waves and a third portion of the second electromagnetic waves reflected inside the first layer from a boundary between the first and second layers, and
compute an estimate for a refractive index of material of the first layer on the basis of the first and second estimates of the thickness of the first layer.

19. The system according to claim 18, wherein the imaging device is an interferometer configured to carry out three-dimensional imaging based on interference between electromagnetic waves reflected from an object being imaged and other electromagnetic waves reflected from a reference reflector.

20. The system according to claim 19, wherein the interferometer is at least one of the following: white-light interferometer, white-light polarization interferometer, stroboscopic scanning white-light interferometer, stroboscopic scanning white-light polarization interferometry.

* * * * *